United States Patent [19]

Kondo et al.

[11] Patent Number: 4,721,251
[45] Date of Patent: Jan. 26, 1988

[54] FLUID DISPERSAL DEVICE

[75] Inventors: Yasuo Kondo, Okazaki; Koji Miura, Gamagori; Osamu Maeda, Okazaki; Makoto Kuroyanagi, Kariya; Takao Oshiro, Toyoake, all of Japan

[73] Assignees: Nippon Soken, Inc., Nishio; Nippondenso Co., Ltd., Kariya, both of Japan

[21] Appl. No.: 47,601

[22] Filed: May 5, 1987

Related U.S. Application Data

[63] Continuation of Ser. No. 757,844, Jul. 22, 1985, abandoned.

[30] Foreign Application Priority Data

Jul. 27, 1984 [JP] Japan .................. 59-157872
Dec. 18, 1984 [JP] Japan .................. 59-266904
May 15, 1985 [JP] Japan .................. 60-103603
May 20, 1985 [JP] Japan .................. 60-107190

[51] Int. Cl.$^4$ .................. B05B 7/12; B05B 1/08
[52] U.S. Cl. .................. 239/412; 137/839; 239/284.1; 239/589.1; 239/600
[58] Field of Search ............ 239/589, 590, 101, 102.1, 239/4, 540, 589.1, 284.1, 284.2, 600; 137/826, 833, 834, 839

[56] References Cited

U.S. PATENT DOCUMENTS

| | | | |
|---|---|---|---|
| 3,247,861 | 4/1966 | Bauer | 137/81.5 |
| 3,378,023 | 4/1968 | Beeken | 137/839 |
| 3,423,026 | 1/1969 | Carpenter | 239/284 |
| 3,575,188 | 4/1971 | Ahern | 137/839 |
| 4,052,002 | 10/1977 | Stouffer et al. | 239/4 |
| 4,151,955 | 5/1979 | Stouffer | 239/540 |
| 4,184,636 | 1/1980 | Bauer | 137/833 |
| 4,231,519 | 11/1980 | Bauer | 239/589 |
| 4,434,812 | 3/1984 | Woods | 137/839 |
| 4,562,867 | 1/1986 | Stouffer | 137/826 |

FOREIGN PATENT DOCUMENTS

50-6644 3/1975 Japan.
59-9378 3/1984 Japan.

Primary Examiner—Andres Kashnikow
Assistant Examiner—Michael J. Forman
Attorney, Agent, or Firm—Cushman, Darby & Cushman

[57] ABSTRACT

A fluid dispersal device has a fluid inlet port, a nozzle, a fluid jet passage and an outlet throat provided in a housing and arranged from the upstream side thereof in order. The sidewalls defining the fluid jet passage are composed of deflection walls, turn walls and branch walls arranged in order from the upstream side thereof. The deflection walls are parallel walls symmetric with respect to the center line of said nozzle, each of the turn walls continues from the downstream end of each of the deflection walls and is formed into a rectangular concave wall, the distance between the opposed rectangular concave walls is larger than that between the deflection walls. The branch walls continue from the downstream ends of the turn walls and project in opposite directions. The outlet throat is defined by the oppositely projecting branch walls. The fluid jet jetted from the nozzle is rightward of leftward deflected due to the interaction between the fluid jet and the deflection walls. The deflection fluid jet is branched by the branch walls into two branch flows in accordance with the amount of deflection thereof. One branch flow is dispersed from the outlet throat while the other branch flow flows into one of the turn walls. The turn walls turn the branch flows and make them collide with the deflected fluid jet perpendicularly to push the deflected fluid jet in a direction opposite to the deflecting direction thereof. Thus, the fluid jet is periodically deflected and oscillated within the fluid jet passage and is dispersed from the outlet throat.

16 Claims, 39 Drawing Figures

F I G.11
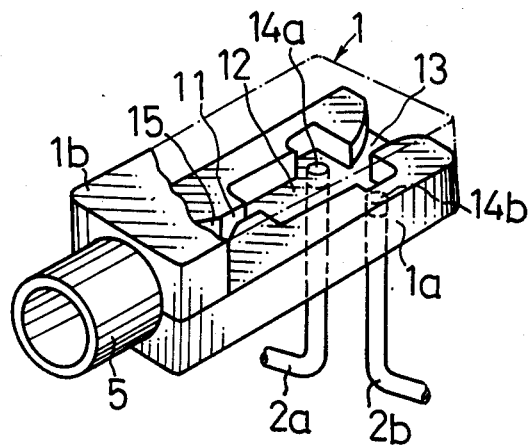
F I G.12
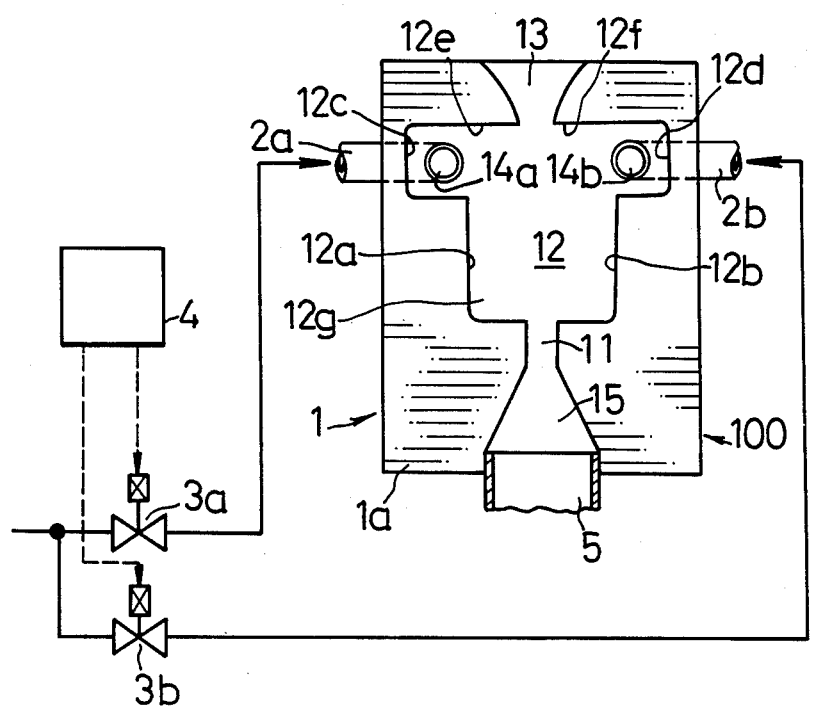

F I G. 17
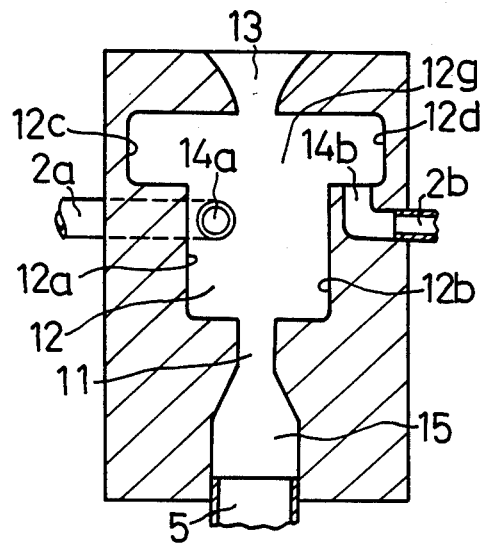
F I G. 18
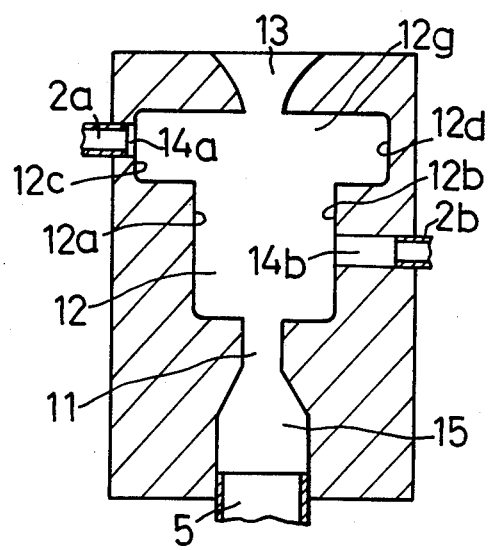

F I G.19
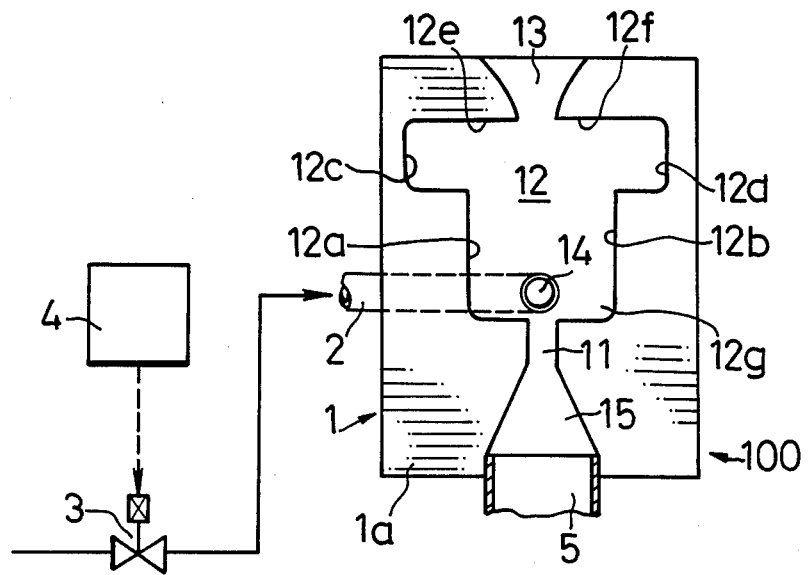

F I G. 20a
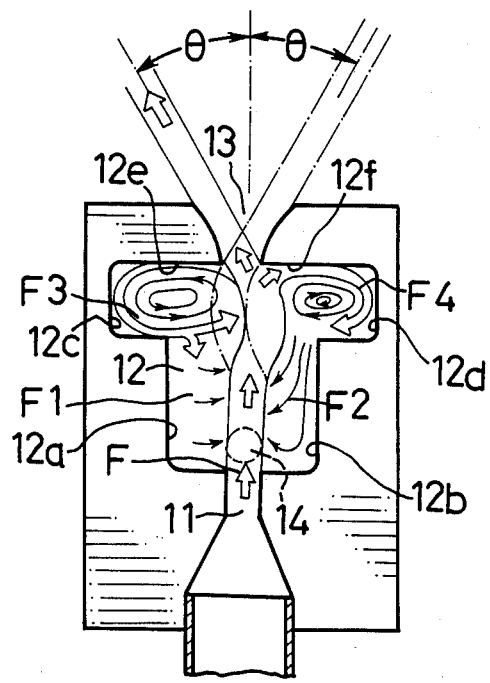
F I G. 20b
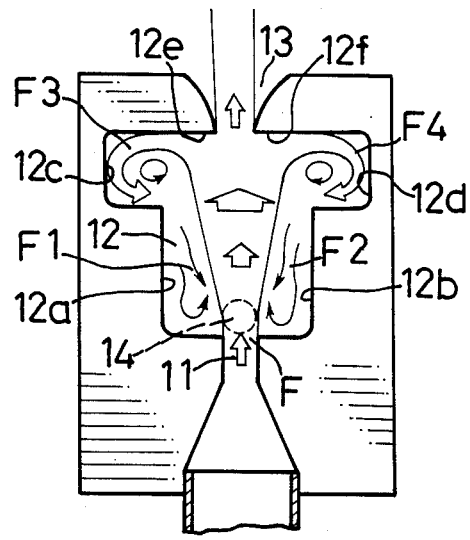

F I G. 21
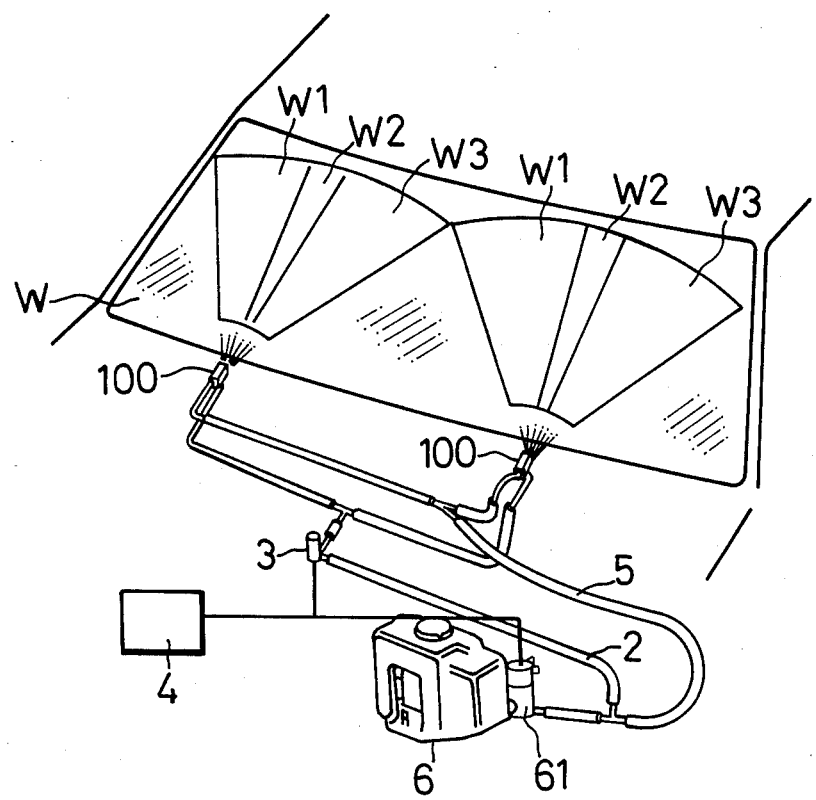

F I G. 28
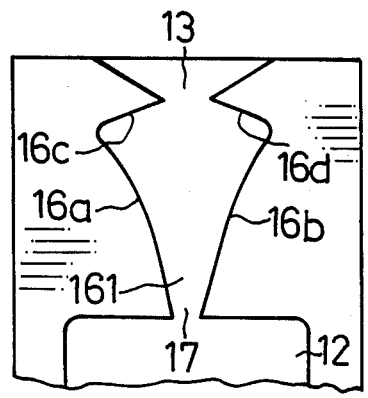
F I G. 29
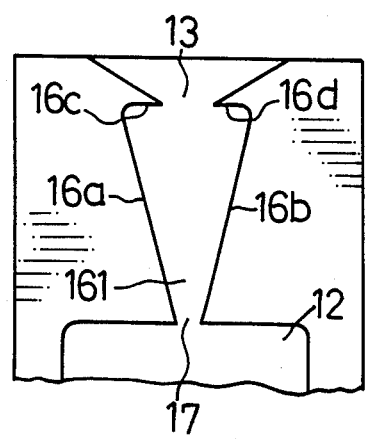

FLUID DISPERSAL DEVICE

This is a continuation of application Ser. No. 757,844, filed July 22, 1985, now abandoned.

BACKGROUND OF THE INVENTION

1. Field of the Invention

The present invention relates to a fluid dispersal device for widely dispersing fluid due to the self oscillation operation of a fluid jet.

2. Description of the Prior Art

The above described fluid dispersal device can disperse fluid by making use of the self oscillation of the fluid jet. So, such a movable member as to deflect the fluid is unnecessary.

Therefore, the above described fluid dispersal device can be made compact and the reliability thereof can be made high.

The above described fluid dispersal device can be widely applied to a window washer nozzle for a vehicle, a sprinkling nozzle for agriculture and industry, etc.

The above described fluid dispersal device conventionally has two types of the structures as shown in FIGS. 1 and 2.

In each of FIGS. 1 and 2, a housing 1 is provided with an inlet port 15 for supplying fluid under pressure to the interior of the housing 1, a nozzle 11 for jetting a fluid jet F, a fluid jet passage 12 and an outlet throat 13 for dispersing the fluid jet F out of the housing 1.

In the fluid dispersal device shown in FIG. 1 (hereinafter will be called "device A"), the fluid jet passage 12 is formed into a vortex chamber. One portion of the fluid jet F is made into a vortex flow within the vortex chamber and is returned toward the nozzle 11 to collide with the fluid jet F in a direction perpendicular thereto. This causes the fluid jet F to be deflected and oscillated.

The fluid dispersal device shown in FIG. 2 (hereinafter will be called "device B") is provided with a feedback passage 12'. One portion of the fluid jet F, which is attached to the wall of the fluid jet passage 12 is returned to the upstream end thereof by way of the feedback passage 12' to deflect the fluid jet F leftward or rightward.

The device A is simple in construction and can be easily produced since it is not provided with the above described feedback passage. However, in the device A, the returned vortex flow is diffused within a large vortex chamber so as to decrease the momentum to be exerted to the flow jet F at collision of the vortex flow therewith. In addition, the fluid jet F tends to maintain a straight flow. Therefore, it is difficult to obtain regular and uniform fluid dispersal over a wide range.

In order to overcome the above described problem of the device A, it has been tried to form a vortex of air within the vortex chamber and form a feedback passage between the formed air vortex and the side wall of the vortex chamber. In this case, there occur problems such that air bubbles are mixed with the fluid jet to make the dispersal density non-uniform.

The device B is free from the above described problems of the device A. However, the device B is comparatively complex in structure. In addition, the feedback passage 12' having a small diameter is liable to be clogged so as to make the operation of the fluid dispersal device unstable.

SUMMARY OF THE INVENTION

It is an object of the present invention to provide a fluid dispersal device for dispersing fluid over a wide range with a uniform density.

It is another object of the present invention to provide a fluid dispersal device which has a simple structure without using any feedback passage and is easily produced.

It is still another object of the present invention to provide a fluid dispersal device which is free from bad operation caused by the interruption of the circulation of fluid such as clogging of narrow passages.

It is a further object of the present invention to provide a fluid dispersal device capable of changing the fluid dispersal range.

The fluid dispersal device of the present invention comprises a housing, a fluid inlet port for supplying a pressurized fluid into the housing, a nozzle for jetting the supplied pressurized fluid as a fluid jet, a fluid jet passage for periodically deflecting the fluid jet therewithin, an outlet throat for dispersing the periodically deflected fluid jet out of the housing. The fluid jet passage is positioned on the downstream of the nozzle and the throat is positioned on the downstream of the fluid jet passage. The fluid jet passage is defined by walls of the housing, which comprise deflection walls oppositely extending from the walls defining the nozzle to the downstream of the fluid jet for deflecting the fluid jet due to the interaction with the fluid jet, turn walls continuing from the deflection walls to the downstream of the fluid jet for turning one portion of the fluid jet to make it collide with the upstream flow of the fluid jet in a direction perpendicular thereto and push it in a direction opposite to the deflecting direction of the fluid jet, branch walls extending from the turn walls to the downstream of the fluid jet for branching the deflected fluid jet into branch flows in accordance with the amount of the deflection of the deflected fluid jet and making one of the branch flows flow toward the turn walls.

BRIEF DESCRIPTION OF THE DRAWINGS

FIGS. 3 to 7 illustrate a first embodiment of the fluid dispersal device according to the present invention;

FIG. 3 is a perspective view of the fluid dispersal device of which a cover plate is partially cut away;

FIG. 4 is a plan view of a base plate illustrating the shape of a fluid passage of the fluid dispersal device;

FIGS. 5 and 6 are views showing the size of portions of the fluid passage;

FIG. 6 is a sectional view taken along the line VI—VI of FIG. 5;

FIGS. 11 to 16 illustrate a fifth embodiment of the fluid dispersal device according to the present invention;

FIG. 11 is a perspective view of the fluid dispersal device of which the cover plate is partially cut away;

FIG. 12 is a plan view of the base plate;

FIG. 15 is a view of a window washer device for a vehicle, to which the fluid dispersal device is applied;

FIG. 16 is a circuit diagram of a control circuit;

FIGS. 17 to 18 are plan view of the base plates of a sixth and seventh embodiment, respectively;

FIGS. 19 to 22 illustrate an eighth embodiment of a fluid dispersal device according to the present invention;

FIG. 19 is a plan view of the base plate;

FIGS. 20a to 20b are views explaining the operation of the fluid dispersal device;

FIG. 21 is a view of a window washer device for a vehicle, to which the fluid dispersal device is applied;

FIG. 22 is a circuit diagram of the control circuit;

FIG. 23 is a perspective view of the fluid dispersal device of which the cover plate is partially cut away;

FIG. 24 is a plan view of the base plate;

FIG. 25 is a view explaining the operation of the fluid dispersal device;

FIG. 26 is a plan view of the partially cut away base plate; and

FIGS. 27 to 31 are plan views of the partially cut away base plates of modified examples of the present invention.

DESCRIPTION OF THE PREFERRED EMBODIMENTS

FIGS. 3 to 7 illustrate a first embodiment of the fluid dispersal device according to the present invention.

Figure 1:
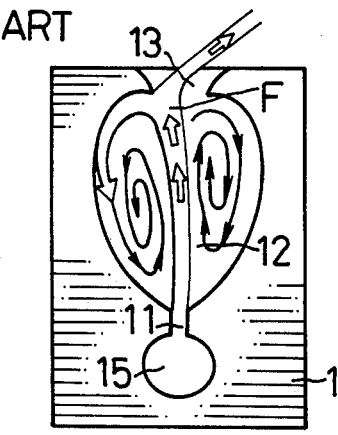
FIGS. 1 and 2 are plan views illustrating the conventional fluid dispersal device, respectively.
Figure 2:
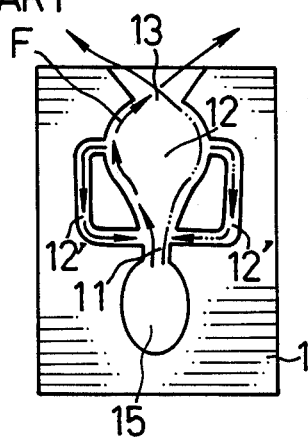
Figure 3:
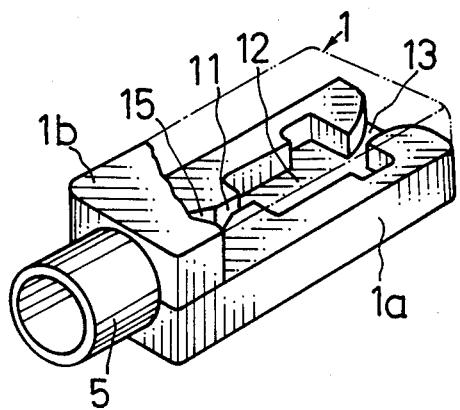

A housing 1 of the fluid dispersal device comprises a base plate 1a and a cover plate 1b abutting on the base plate 1a as shown in FIG. 3. A fluid supply pipe 5 is connected to the housing 1. The base plate 1a is provided with a groove having a predetermined depth in the surface opposed to the cover plate 1b. The groove comprises a fluid inlet port 15 to be communicated with the fluid supply passage 5, a nozzle 11, a fluid jet passage 12 and an outlet throat 13.

Figure 4:
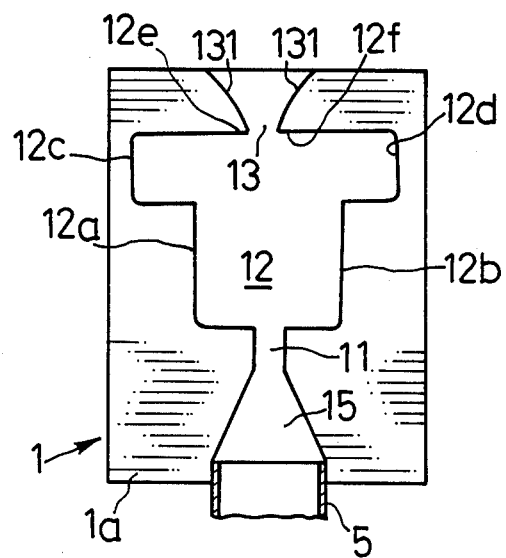

As shown in FIG. 4, the fluid inlet port 15 is converged from the upstream end thereof toward the downstream end thereof and is communicated with the nozzle 11 having a predetermined width. The fluid jet passage 12 is located on the downstream of the nozzle 11 and symmetric with respect to the center line of the nozzle 11. The side walls of the upstream portion of the fluid jet passage 12 are formed into parallel deflection walls 12a and 12b having a distance larger than the width of the nozzle 11.

The side walls of the downstream portion of the passage 12 are formed into concave turn walls 12c and 12d having a distance larger than that of the deflection walls 12a, 12b. The downstream ends of the turn walls 12c, and 12d form branch walls 12e, and 12f adjacently opposed to each other. Between the branch walls 12e and 12f is formed the outlet throat 13. The downstream walls 131 of the throat 13 diverge outwardly.

Figure 5:
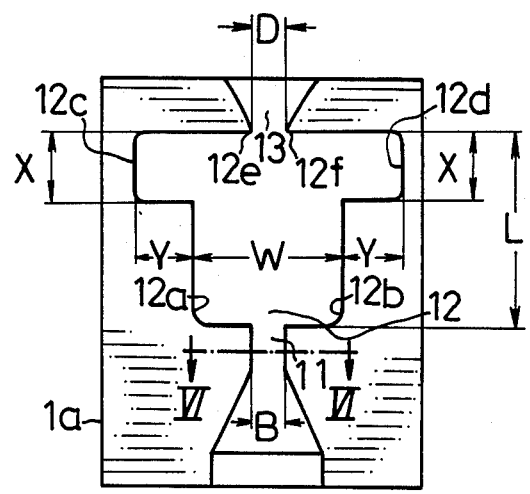
Figure 6:
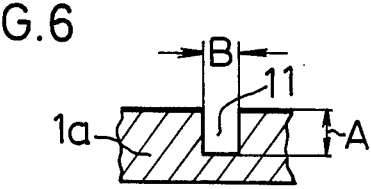

Let the size of several portions of the nozzle 11, the passage 12 and the throat 13 be A, B, D, L, X, Y, W as shown in FIGS. 5 and 6, one example of the preferable size ratio is as follows. The size A represents the depth of the nozzle 11, the passage 12 and the throat 13.

W/B=5, L/B=7, Y/L=0.3, X/Y=0.5

D/B=1.2, A/B=1.5

Other preferable size ratios are distributed over a considerably wide permissible range. Hereinafter, the operation of the fluid dispersal device having the above structure will be explained.

Figure 7A:
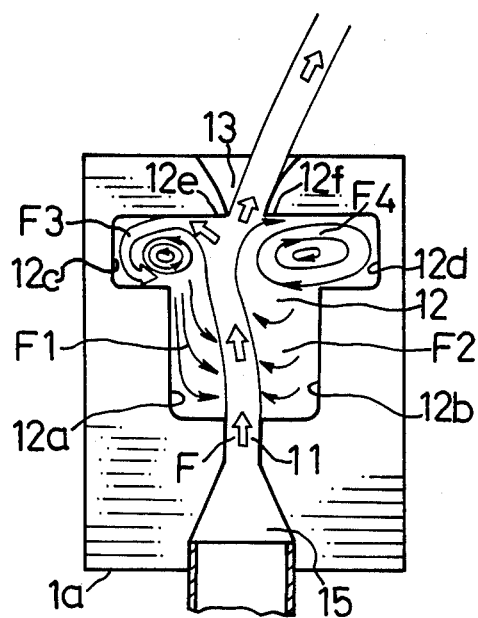
FIGS. 7a to 7c are views explaining the operation of the fluid dispersal device, respectively.

A fluid under pressure is supplied to the nozzle 11 by way of the fulid inlet port 15 in FIG. 7a to form a fluid jet F having a predetermined width in the fluid jet passage 12. The fluid jet F sucks the fluid located therearound to produce a negative pressure between the fluid jet F and each of the deflection walls 12a and 12b. Then, sucked flows F1 and F2 flow into the upstream portion of the fluid jet passage 12 from the downstream portion thereof.

The amount of the sucked flows F1 and F2 differ form each other due to slight unsymmetry of the shape of the flowing passage thereof. Consequently, difference in negative pressure occurs between the fluid jet F and each of the deflection walls 12a and 12b so that the fluid jet F is sucked and deflected toward one of the deflection walls 12a and 12b. (e.g. left deflection wall 12a as shown in FIG. 7a) The negative pressure between the fluid jet F and the deflection wall 12a gradually increases with the deflection of the fluid jet F. Consequently, the fluid jet F is largely deflected much more.

Figure 7B:
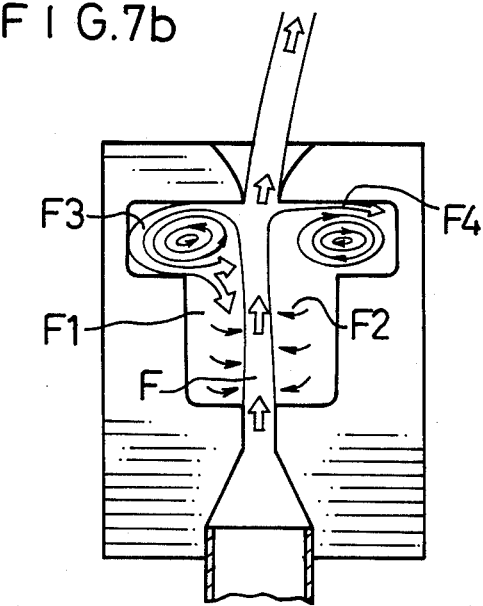

At this time, the fluid jet F flows out of the fluid jet passage 12 through the throat 13. One portion of the fluid jet F collides with the branch walls 12e and 12f and is branched into branch flows F3 and F4. The branch flows F3 and F4 flow toward the turn walls 12c and 12d and turn into the upstream side of the fluid jet passage 12. The amount of the branch flows F3 and F4 increases in accordance with the amount of rightward and leftward deflection of the fluid jet F. When the fluid jet F is deflected leftward as shown in FIG. 7a, the amount of the branch flow F3 increases. And the branch flow F3 grows with the deflection of the jet flow F, flows along the turn wall 12c and turns rightward. Then, the turned branch flows F3 collides with the fluid jet F in a direction perpendicular to the flowing direction of the fluid jet F to generate a collision force. At this time, one portion of the turned branch flow F3 flows into the fluid jet F as sucked flow F1 to decrease the negative pressure between the fluid flow F and the deflection wall 12a. Due to the collision force and the increase in negative pressure, the fluid jet F is returned to a straight flow directed straight toward the throat 13 (FIG. 7b).

Figure 7C:
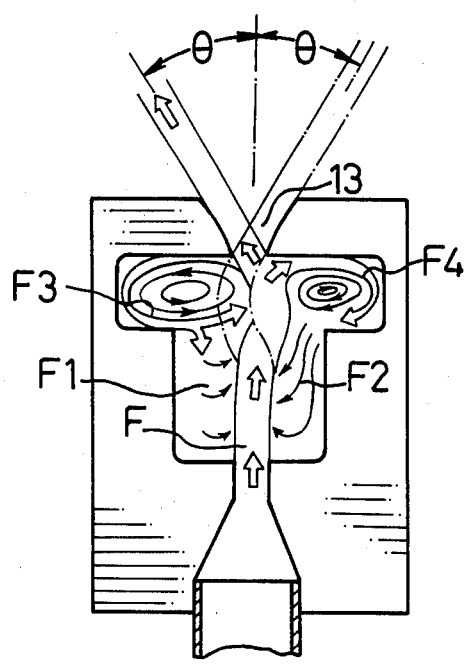

Then, the fluid jet F is deflected rightward due to rightward inertia force to produce sucked flow F2 and branch flow F4 as shown in FIG. 7c.

FIG. 7c shows the state just before the branch flow F4 collides with the fluid jet F. At this time, the fluid jet F is largely curved rightward by the remaining branch flow F3 directly before passing the outlet throat 13 and is jetted out of the passage 12 leftward at an angle to the center line of the nozzle 11.

When the branch flow F4 grows and collides with the fluid jet F, the fluid jet F is gradually pushed leftward so as to be curved leftward as shown by alternate long and short dash lines in FIG. 7c and the fluid jet F is jetted out of the fluid jet passage 12 rightward at an angle θ to the center line of the nozzle 11.

As described above, the fluid jet F cyclically repeats the rightward and leftward deflection to enable uniform dispersion of fluid over a wide range.

The downstream wall 131 can be formed into a straight or curved surface diverging away from the throat 13. The inclination angle of the downstream wall 131 can be arbitrarily selected in accordance with the usage of the fluid dispersal device of the present invention.

It is preferable to make the width of the throat 13 slightly smaller than that of the fluid jet F so as to prevent problems such as the change of the density of the fluid yet caused by air flowing form the outside of the throat 13.

As described above, in the first embodiment, the fluid jet passage is defined by the side walls comprising deflection walls for sucking and deflecting the fluid yet due to the interaction therebetween, branch walls for branching the deflected fluid jet into branch flows and turn walls for turning one of the branch flows and making the turned branch flow collide with the deflected fluid jet to push it in a direction opposite to the deflecting direction thereof. The fluid dispersal device of the first embodiment enables regular and uniform fluid dispersal over a wide range without providing feedback passages.

Since no feedback passage is required in the fluid dispersal device of the first embodiment, the structure thereof can be made simple and it can be easily produced. In addition, the fluid dispersal device of the first embodiment is free from problems such that smooth fluid flow within the feed back passage of a small diameter is obstructed or the feedback passage is clogged with dust, etc.

Figure 8:
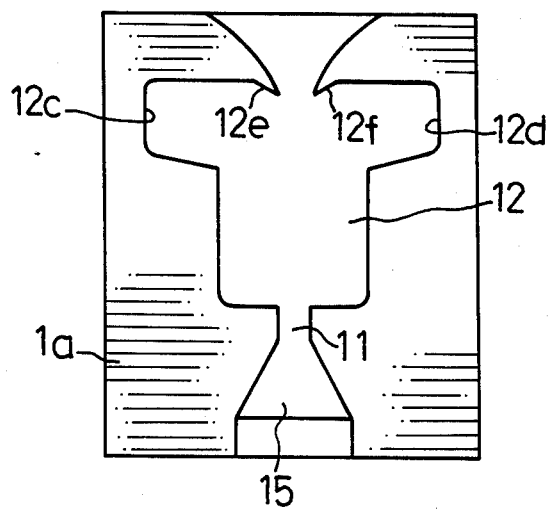
FIGS. 8 to 10 are plan views of the base plates of a second to a fourth embodiment, respectively.

FIG. 8 illustrates a second embodiment of the fluid dispersal device according to the present invention.

In the second embodiment, the branch walls 12e and 12f and the upstream walls of the turn walls 12c and 12d are inclined so as to direct toward the upstream side of the fluid jet F. According to the second embodiment having the above described structure, the branching action by the branch walls 12e and 12f can be smoothed and the fluid jet pushing action by the branch flows F3 and F4 can be effectively performed.

Figure 9:
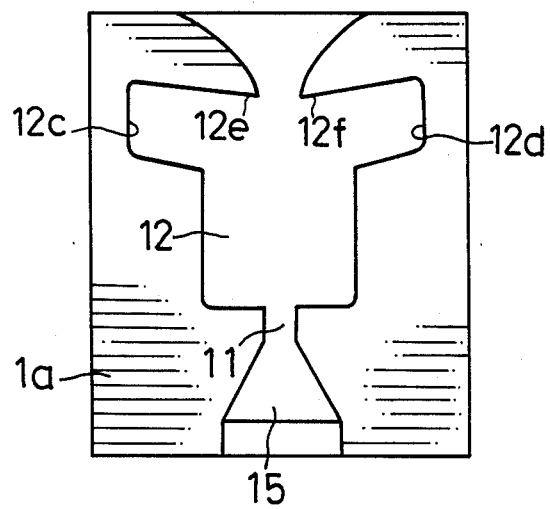

FIG. 9 illustrates a third embodiment of the fluid dispersal device according to the present invention.

In the third embodiment, the downstream wall of each of the turn walls 12c and 12d is formed into an inclined wall which straightly continues to the branch wall 12e or 12f.

Figure 10:
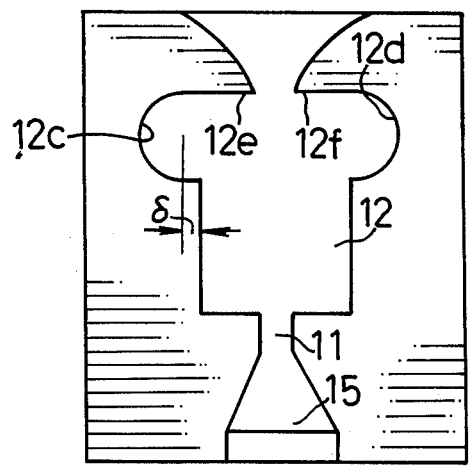

FIG. 10 illustrates a fourth embodiment of the fluid dispersal device according to the present invention.

In the fourth embodiment, the turn walls 12c and 12d are made into semi-circular walls. These semi-circular walls enable smooth turning of the branch flows F3 and F4. And it is preferable to set the starting point of the semi-circular wall at a position which is rightward or leftward away from the corner portion of the wall 12c or 12d by a distance of δ as shown in FIG. 10 for guiding the branch flow F3 or F4 and making it surely collide with the fluid jet F.

FIGS. 11 to 16 illustrate a fifth embodiment of the fluid dispersal device according to the present invention.

The structure of the fluid dispersal device 100 of the fifth embodiment is substantially the same as that of the first embodiment except that supplemental fluid supply pipes 2a and 2b are connected to the housing 1.

In FIG. 12, supplemental fluid inlet ports 14a and 14b open in a bottom wall 12g of the fluid jet passage 12 surrounded by the turn walls 12c and 12d. To each of the inlet ports 14a and 14b is connected each of the supplemental fluid supply pipes 2a and 2b. The supply pipes 2a and 2b are communicated with a fluid supply source (not shown) by way of electromagnetic valves 3a and 3b, respectively.

The electromagnetic valves 3a and 3b are opened and closed by a control circuit 4.

Figure 13A:
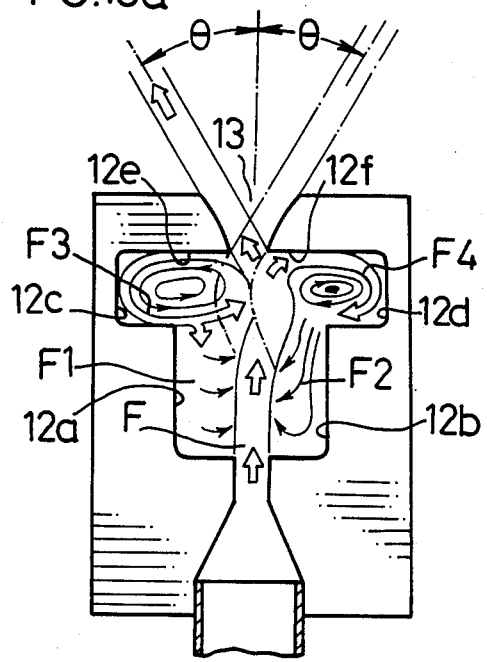
FIGS. 13a to 13c are views explaining the operation of the fluid dispersal device, respectively.

When both of the electromagnetic valves 3a and 3b are closed, no supplemental fluid is supplied to the inlet ports 14a and 14b. At this time, the fluid jet F is periodically deflected and dispersed rightward and leftward symmetrically over the range of an angle 2θ as shown in FIG. 13a.

Namely, due to the sucked flows F1 and F2, negative pressure is produced between the fluid jet F and the deflection wall 12a or 12b. The fluid jet F is sucked and deflected toward one of the deflection walls 12a and 12b (e.g. the deflection wall 12b as shown in FIG. 13a).

One portion of the deflected fluid jet F collides with the branch walls 12e and 12f and is branched into branch flows F3 and F4 directing to the turn walls 12c and 12d, respectively. The branch flows F3 and F4 grow in accordance with the amount of deflection of the fluid jet F, and collide with the fluid jet F in a direction perpendicular to the flowing direction thereof. (FIG. 13a shows the state just before the branch flow F4 collides with the fluid jet F).

Then, the branch flow F3 or F4 push the fluid jet F toward the opposed deflection walls (e.g. toward the deflection wall 12a as shown by short and long dash lines). The above processes are repeated so that the fluid jet F is periodically deflected rightward and leftward and is dispersed out of the outlet throat 13.

Figure 14A:
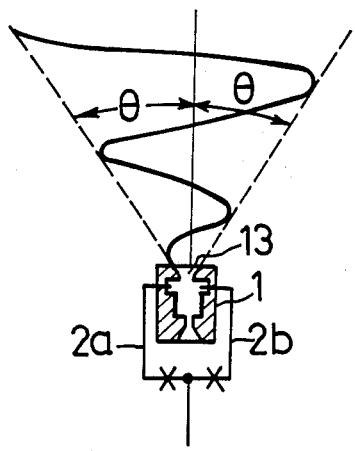
FIGS. 14a to 14d are views illustrating the dispersal range of the fluid dispersal device, respectively.

FIG. 14a illustrates a dispersing pattern of the fifth embodiment shown in FIG. 13a.

Figure 14C:
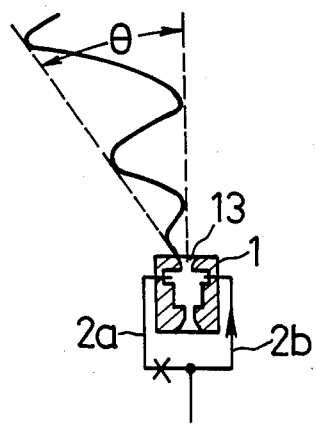
Figure 14B:
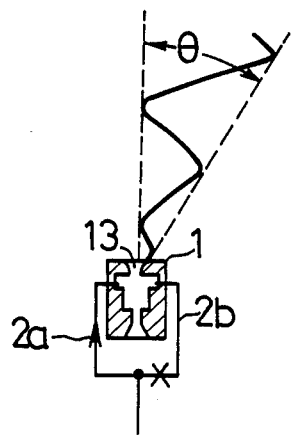

In FIGS. 14a to 14c, X marks show that the electromagnetic valve (3a, 3b) shown in FIG. 12 is closed to stop the fluid supply to the supplemental fluid supply pipe (2e, 2b).

When the electromagnetic valve 3a is opened, supplemental fluid under presure is supplied to the fluid jet passage 12 through the inlet port 14a by way of the fluid supply pipe 2a to increase the pressure of the left half of the fluid jet passage 12. At this time, the supplemental fluid flows toward the throat 13 to produce a rightward momentum as shown in FIG. 13b. Due to the increase in pressure, the fluid jet F within the fluid jet passage 12 is deflected rightward and collides with the branch wall 12f. Then, the fluid jet F is branched into two branch flows directed toward the throat 13 and the turn wall 12d, respectively. The branch flow toward the throat 13 receives the rightward momentum of the supplemental fluid and flows out of the throat 13 in a straight direction.

The branch flow F4 directed toward the turn wall 12d is turned thereby and collides with fluid jet F. The fluid jet F is pushed leftward by the branch flow F4 to return to a straight flow.

Figure 13C:
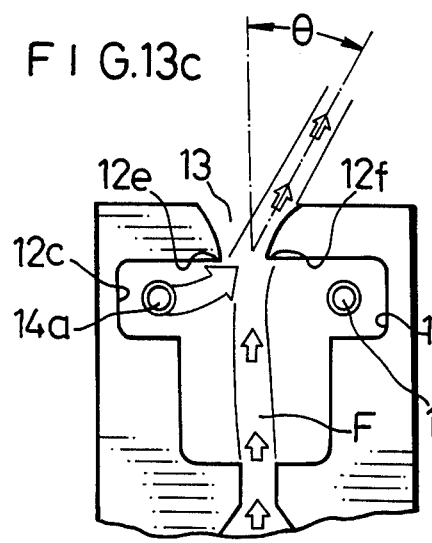
Figure 13B:
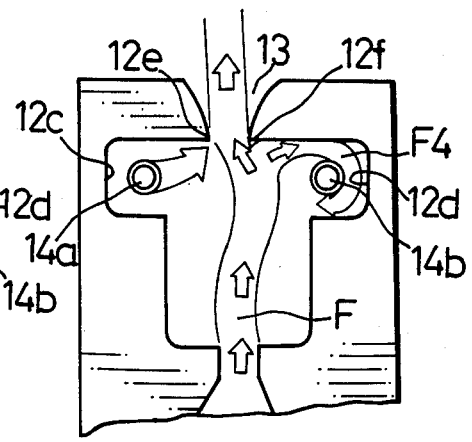

This straight flowing fluid jet F is jetted out of the throat 13 in a direction rightward inclined from the center line of the fluid jet passage 12 by an angle θ due to the rightward momentum of the supplemental fluid from the inlet poart 14a as shown in FIG. 13c. This straight flowing fluid jet F receives high pressure from the left half of the fluid jet passage 12 and is deflected again rightward.

The repetition of the above described pressure results in the fluid jet F being dispersed only rightward over a range of an angle $\theta$ as shown in FIG. 14b.

When the electromagnetic valve 3b is opened in place of the valve 3a, the supplemental fluid is supplied to the fluid jet passage 12 through the inlet port 14b by way of the supply pipe 2b. The fluid jet F is dispersed only leftward over a range of an angle $\theta$ as shown in FIG. 14c.

Figure 14D:
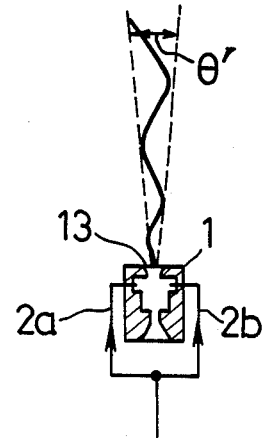

When both of the electromagnetic valves 3a and 3b are opened, the increase in pressure and the production of the momentum due to the supply of the supplemental fluid similarly occur in both of the left and right sides of the fluid jet F. This results in the deflection of the fluid jet F being restricted rightward and leftward to cause the fluid jet F to be dispersed from the throat 13 within a narrow range of an angle $\theta'$ along the center line thereof as shown in FIG. 14d.

Figure 15:
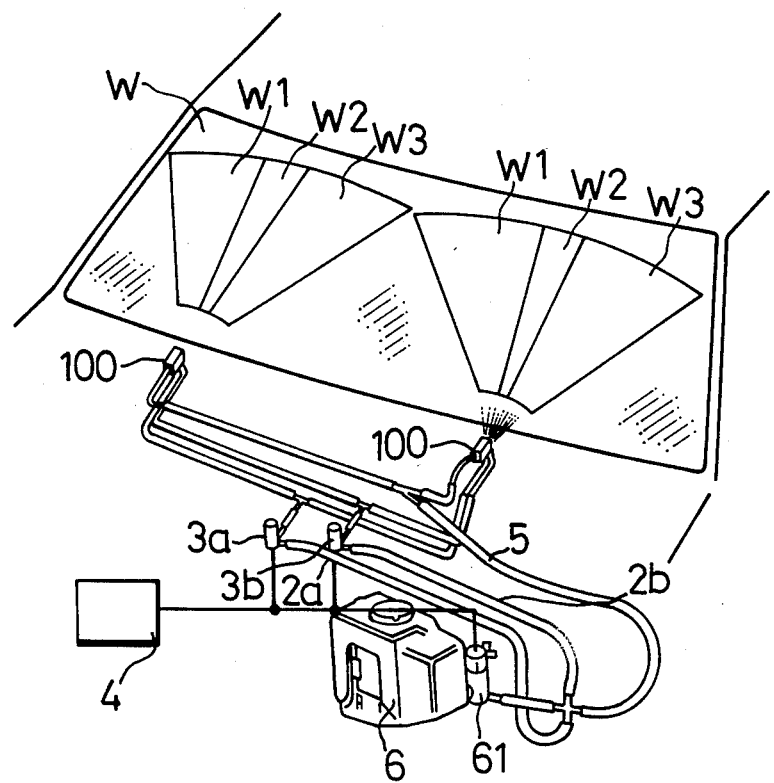

FIG. 15 illustrates the example wherein the fluid dispersal device of the present invention is used in a window washer for a vehicle. In FIG. 15, a pair of fluid dispersal device 100 are provided in front of the lower edge of a windshield glass W of a vehicle. A main fluid supply pipe 5 is connected to a washer pump 61 provided in a washer tank 6 and is branched to supplemental fluid supply pipes 2a and 2b. The washer pump 61 and electromagnetic valve 3a and 3b provided in the supply pipes 2a and 2b are operated by a control circuit 4.

Figure 16:
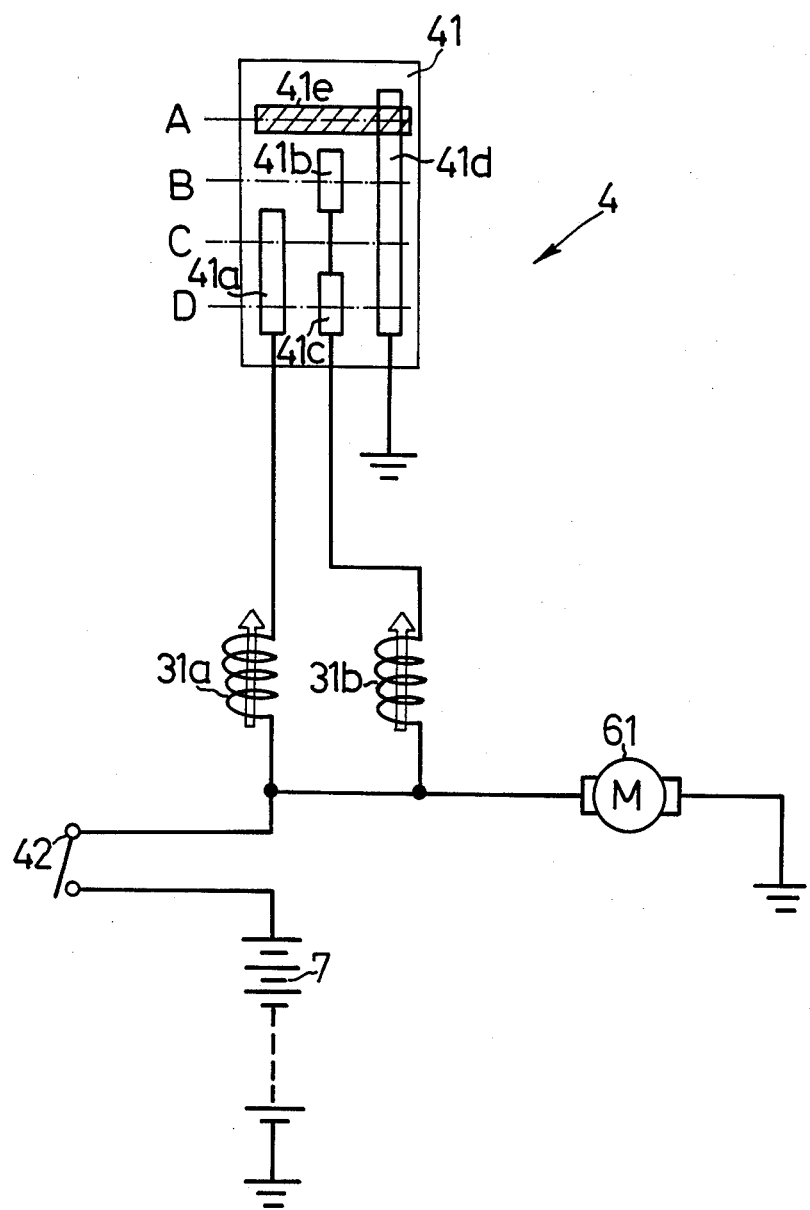

FIG. 16 illustrates a circuit diagram of the control circuit 4.

In FIG. 16, a dispersal mode selection switch 41 comprises fixed contacts 41a, 41b, 41c, 41d and movable contact 41e coming in contact with the fixed contacts 41a to 41d.

The reference numeral 42 designates a washer switch, the reference numeral 7 designates a battery and the reference numerals 31a and 31b designated electromagnetic coils of the electromagnetic values 3a and 3b.

When the washer switch 42 is closed in the state where the movable contact 41e is located at A position as shown in FIG. 16, the electromagnetic coils 31a and 31b are not excited. Therefore, the washer pump 61 is started to supply washer liquid to only the inlet port 15 (FIG. 12) by way of the main fluid supply pipe 5. Then, the washer liquid is dispersed over a wide range shown by W1, W2 and W3 in FIG. 15.

When the movable contact 41e is located at B position, the fixed contacts 41b and 41d are conducting. When the washer switch 42 is closed in this state, only the electromagnetic coil 31b is excited to open the electromagnetic valve 3b. The supplemental fluid is supplied to the inlet port 14b (FIG. 12) of the fluid dispersal device 100 in addition to the main fluid supplied from the washer pump 61. This results in the washer liquid being dispersed only within a range W1 shown in FIG. 15.

When the movable contact 41e is located at C position or D position, the washer liquid is dispersed within the range W3 or W2 shown in FIG. 15.

According to the fifth embodiment, the washer liquid can be dispersed only in the stained area on the windshiled glass W so as to enable the effective wash thereof.

FIGS. 17 and 18 illustrate a sixth and a seventh embodiment according to the present invention, respectively.

The inlet ports 14a and 14b need not be provided in the bottom wall 12g of the fluid jet passage 12 defined by the turn walls 12c and 12d. The inlet poarts 14a and 14b can be provided in the bottom wall 12g adjacent to the deflection wall 12a (e.g. the inlet port 14a in FIG. 17). Furthermore, the inlet ports 14a and 14b can be provided in the deflection walls 12a and 12b and the turn walls 12c and 12d as shown in FIGS. 17 and 18.

One of the inlet ports 14a and 14b for the supplemental fluid can be omitted. Furthermore, a plurality of inlet ports for the supplmental fluid can be provided in each of the right side and the left side of the fluid jet passage 12.

Each of the supplemental fluid supply passages 2a and 2b can be provided with a throttle for controlling the fluid dispersal angle.

The supply source for the supplemental fluid can be provided separately from that for the main fluid.

FIG. 19 ilustrates an eighth embodiment according to the present invention.

In the eighth embodiment, the supplemental fluid inlet port 14 is provided near the nozzle 11. To the inlet port 14 is connected one end of the supplemental fluid supply pipe 2 The other end of the supplemental fluid supply pipe 2 is connected to the supply source (not shown). The electromagnetic valve 3 is provided in the pipe 2 for controlling the supply of the supplemental fluid and is opened and closed by the control circuit 4.

When the electromagnetic valve 3 is closed, no supplemental fluid is supplied to the inlet port 14. In this state, the fluid jet F is periodically deflected and dispersed over a wide range having an angle $2\theta$, which is symmetrical with respect to the center line of the throat 13 as shown in FIG. 20(1). When the electromagnetic valve 3 is opened, the supplemental fluid having a predetermined pressure is supplied to the inlet port 14. The supplied supplemental fluid collides with the fluid jet F from the nozzle 11 in a direction perpendicular to the flowing direction of the fluid jet F. After the collision, the fluid jet F is dispersed so that the width thereof is enlarged as shown in FIG. 20b to grow the branch flows F3 and F4 similarly. At this time, the pressure within the fluid jet passage 12 surrounded by the deflection walls 12a and 12b increases so that the sucked flows F1 and F2 become weak. This causes the fluid jet F to flow straight toward the throat 13 without rightward and leftward deflection. Thereafter, the fluid jet F is dispersed from the outlet throat 13 within a limited range.

FIG. 21 illustrates the example in which the fluid dispersal device 100 of the eighth embodiment is employed in a window washer device for a vehicle. In FIG. 21, two fluid dispersal devices are provided at the left and the right of the windshield glass W of a vehicle in front of the lower edge thereof. The main fluid supply pipe 5 is connected to the washer pump 61 provided in the washer tank 6. The supplemental fluid supply pipe 2 is branched from the supply pipe 5. The washer pump 61 and the electromagnetic valve 3 are operated by the control circuit 4.

Figure 22:
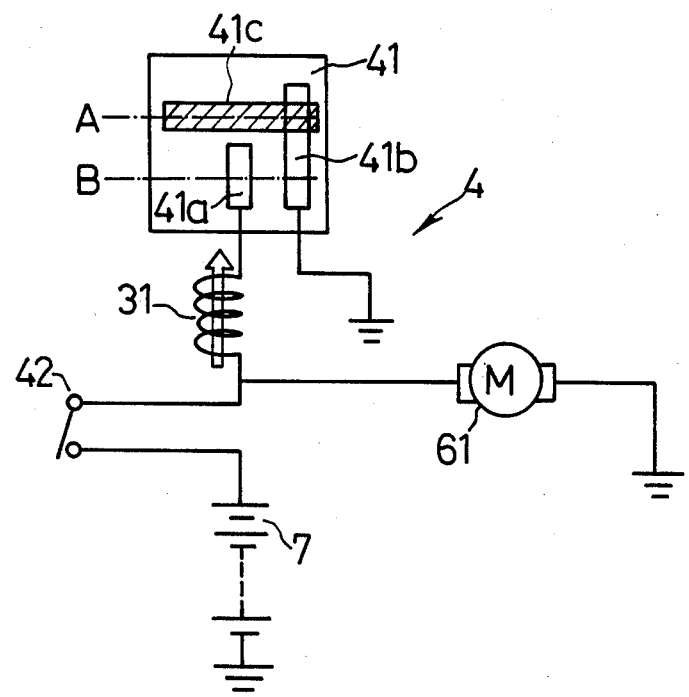

FIG. 22 is a circuit diagram of the control circuit 4. The reference numeral 41 designates a dispersal mode selection switch, the reference numeral 42 designates a washer switch, the reference numeral 7 designates a battery and the reference numeral 31 designates an electromagnetic coil of the electromagnetic valve 3. The selection switch 41 comprises fixed contacts 41a and 41b and a movable contact 41c coming in contact with the fixed contacts to conduct voltage thereto.

When the movable contact 41c is set to A position as shown in FIG. 22 and the washer switch 42 is closed, the electromagnetic coil 31 is not excited. So, the washer pump 61 starts up to supply the washer liquid as a main fluid to only the inlet port 15 (FIG. 19). In this case, the washer liquid is dispersed over a wide range shown by W1, W2 and W3 in FIG. 21.

When the movable contact 41c is set to B position and the washer switch 42 is closed, the electromagnetic coil 31 is excited to open the electromagnetic valve 3. The washer liquid as the supplemental fluid is supplied to the inlet port 14 of the dispersal device 100. In this case, the fluid jet F is dispersed only within the range W2 shown in FIG. 21.

According to the eighth embodiment, the washer liquid can be dispersed on only narrow areas of the windshield glass W, opposed to eyes of a driver. Therefore, effective cleaning can be performed.

In the eighth embodiment, the supplemental fluid inlet port 14 may be provided in the cover plate (not shown) covering the base plate 1a. Furthermore, the supplemental fluid inlet port 14 can be provided in each of the base plate 1a and the cover plate so as to be opposed to each other.

The supply source for the supplemental fluid can be provided separately from that for the main fluid.

The supplemental fluid supply passage 2 can be provided with a throttle for controlling the fluid dispersal angle.

FIGS. 23 to 26 illustrate a ninth embodiment of the fluid dispersal device according to the present invention.

Figure 23:
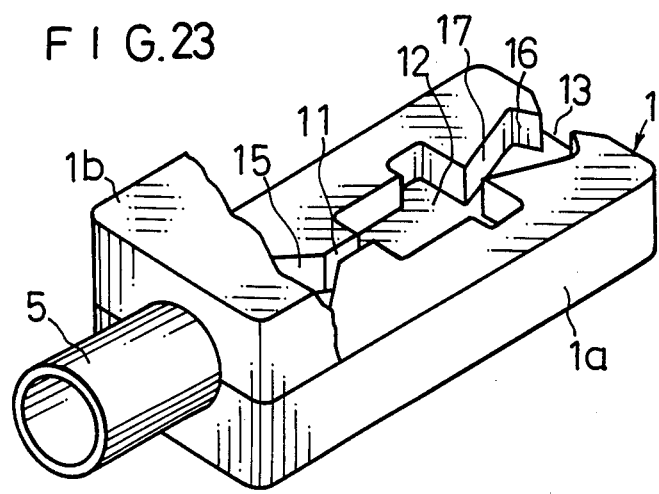
FIGS. 23 to 26 illustrate a ninth embodiment of the fluid dispersal device according to the present invention.
Figure 24:
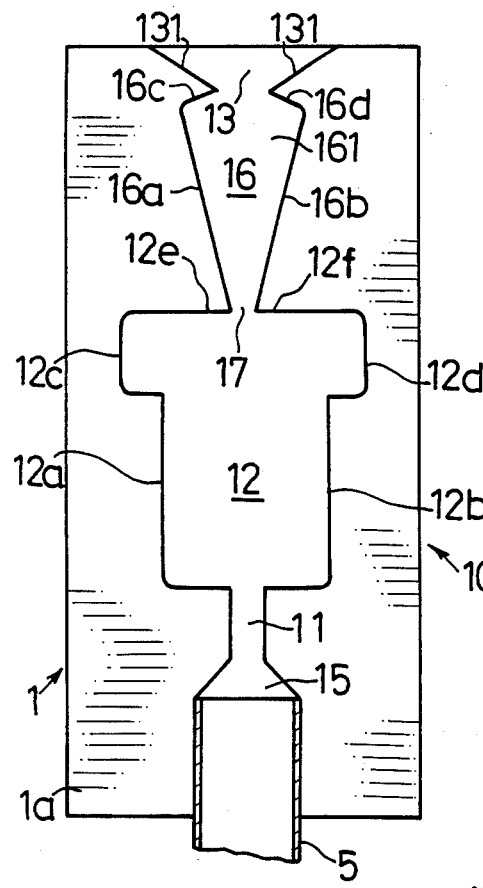

In the ninth embodiment, the housing 1 comprises the base plate 1a and the cover plate 1b as shown in FIG. 23. The fluid supply pipe 5 is connected to the housing 1 for supplying the main fluid to the housing 1. In the upper surface of the base plate 1a is formed a groove having a predetermined depth. The groove is formed into the fluid supply port 15, the nozzle 11, the fluid jet passage 12, a jet opening 17, the deflection amount increase passage 16 and the outlet throat 13.

The above described passage 12 has the same structure as that of each of the preceding embodiments.

The deflection amount increase passage 1b is located on the downstream of the jet opening 17 and is defined by guide walls 16a and 16b each linearly and symmetrically diverging toward the outlet throat 13. The downstream end of each of the guide walls 16a and 16b is curved oppositely to be formed into downstream turn walls 16c and 16d defining the outlet throat 13. The outlet walls 131 positioned on the downstream of the throat 13 outward diverge. Between the guide walls 16a and 16b is formed a vortex chamber 161.

Figure 25:
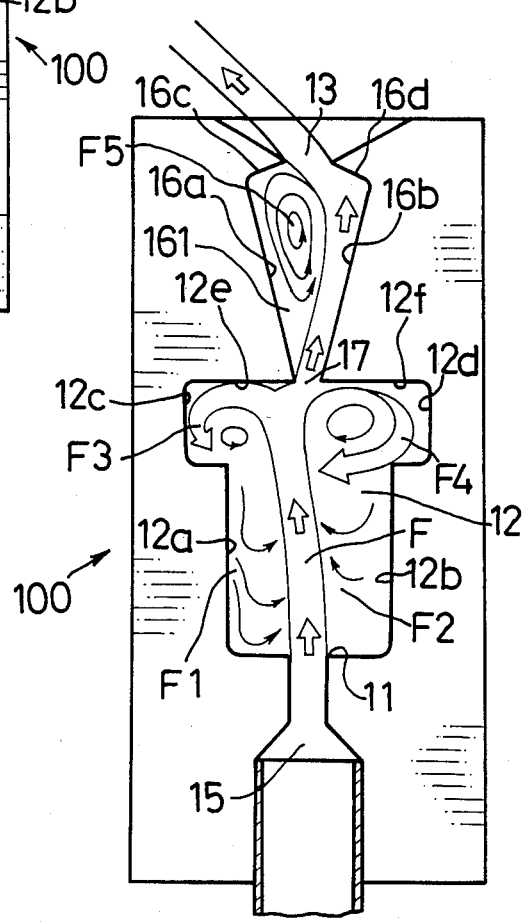
Figure 26:
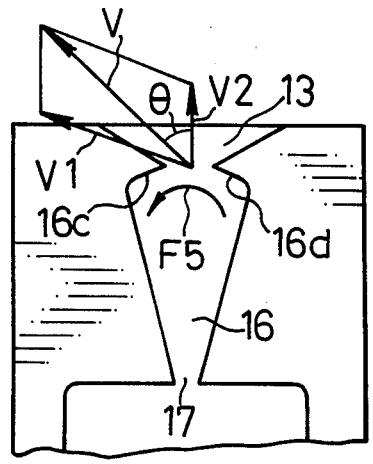

In operation, when the fluid is supplied to the dispersal device 100, the fluid is jetted into the fluid jet passage 12 through the nozzle 11 as shown in FIG. 25.

The fluid jet F is periodically deflected leftward and rightward within the fluid jet passage 12 in the same procwss as described in the preceding embodiments.

When the fluid jet F flows straight within the passage 12, it also flow straight within the vortex chamber 161 and is supplied out of the vortex chamber 161 through the outlet throat 13.

When the fluid jet F is deflected as shown in FIG. 25, the fluid jet F jetted from the jet opening 17 attaches to the guide wall 16b and is guided therealong. Then, the fluid jet F is turned by the turn wall 16d and flowed into the outlet throat 13 at a large angle. At this time, one portion of the fluid jet F is returned to the upstream side of the vortex chamber 161 to form a vortex flow F5 within the vortex chamber 161.

The formed vortex flow F5 has a large leftward or rightward momentum (e.g. leftward in FIG. 25) in the vicinity of the outlet throat 13 so as to increase the leftward or rightward component force V1 (e.g. leftward in FIG. 26) of the fluid jet F. The component force V1 is combined with the straight component force V2 formed by the static pressure and the flow quantity of the fluid flow F to produce a jet force V for jetting the fluid jet F at a large angle $\theta$.

Figure 27:
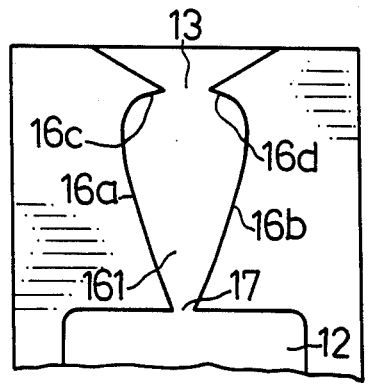

The guide walls 16a and 16b may be formed into a concave(FIG. 27) or a convex(FIG. 28).

Figure 30:
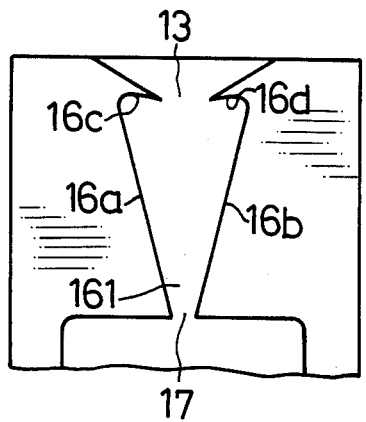

The downstream turn walls 16c and 16d can be made extend in a direction perpendicular to the flow of the fluid jet F (FIG. 29) or incline toward the upstream side( FIG. 30).

Figure 31:
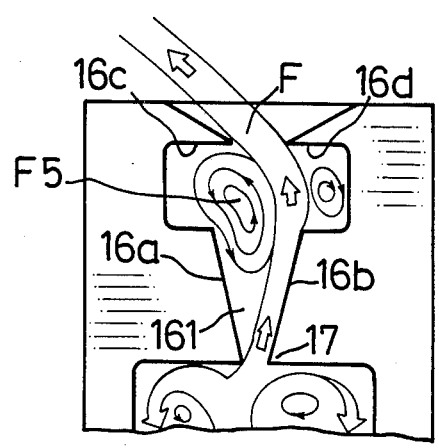

Furthermore, by enlarging the downstream half of the vortex chamber 161 as shown in FIG. 31, a strong vortex F5 can be produced within the vortex chamber 161.

In the ninth embodiment and the above described modified examples, it is preferable to make the diameter of the outlet throat 13 nearly double that of the jet opening 17.

What is claimed is:

1. A fluid dispersal device comprising:
   a housing having wall means defining a first chamber and a second chamber, which is stepwise widened from said first chamber, in the interior of said housing, said first chamber being unobstructably comunicated with said second chamber
   a fluid inlet port in a wall of said housing for introducing pressurized fluid thereinto;
   a nozzle in said housing and communicated with said fluid inlet port for jetting the pressurized fluid from said fluid inlet port into said first chamber as a fluid jet; and
   an outlet throat in a wall of said housing for jetting the fluid jet from said second chamber;
   said wall means being composed of
   deflection wall means partly defining said first chamber, for sucking and deflecting the fluid jet jetted from said nozzle due to the interaction therewith in one deflecting direction, said deflection wall means extending sidewards from said nozzle and then extending towards only said outlet throat,
   branch wall means for branching the deflected fluid jet into two branch flows, one branch flow flowing into said outlet throat and jetting from said outlet throat, and the other branch flow flowing sidewards in said second chamber, and
   turn wall means extending from said deflection wall means stepwise and in part defining said second chamber for turning said other branch flow and colliding the turned other branch flow with the deflected fluid jet in a direction generally perpendicular to the jetting direction of the deflected fluid jet to push the deflected fluid jet in a direction opposed to the one deflecting direction,
   said deflection wall means having two opposed deflection wall portions, said turn wall means having two opposed concave-shaped turn portions, the distance between said opposed turn wall portions being larger than that between said opposed deflection wall portions, said branch wall means having two spaced branch wall portions, each projecting from a downstream end of said throat and spaced from each other through a predetermined distance, and said outlet throat being defined in part by said opposed branch wall portions.

2. A fluid dispersal device according to claim 1, wherein said turn wall portions are partly rectangular in section.

3. A fluid dispersal device according to claim 2 wherein said turn wall portions have an upstream side wall and a downstream side wall, each inclined toward the nozzle.

4. A fluid dispersal device according to claim 1, wherein said turn wall means is formed into a semicircular concave wall.

5. A fluid dispersal device according to claim 1, wherein said branch wall portions are toward the nozzle.

6. A fluid dispersal device according to claim 1, wherein said housing comprises two pieces of plate each having a predetermined thickness, which are abutted on each other; one of said plates is provided with a groove having a predetermined depth in a surface thereof abutting the other plate and said groove is composed of said fluid inlet port, said nozzle, said wall means and said outlet throat.

7. A fluid dipersal device according to claim 1, further comprising at least one supplemental fluid inlet port opening in a wall of the housing and connected to a supplemental fluid supply pipe for supplying supplemental fluid having a predetermined pressure to the interior of said housing and a control means for controlling the supply of the supplmental fluid to said supplemental fluid inlet port.

8. A fluid dispersal device according to claim 7, wherein said control means comprises an electromagnetic valve provided in said supplemental fluid supply pipe, and a control circuit for operating said electromagnetic valve.

9. A fluid dispersal device according to claim 7, wherein said at least one supplemental fluid inlet port is located near said nozzle on the center line of said nozzle.

10. A fluid dispersal device according to claim 7, wherein said at least one supplemental fluid inlet port comprises a plurality of inlet ports and at least one inlet port opens to the interior of the housing on one side of the center line of the nozzle while the other inlet ports open to the interior of said housing on the other side of said center line.

11. A fluid dispersal device according to claim 10, wherein said control means supplies fluid to said inlet ports one at a time.

12. A fluid dispersal device according to claim 10, wherein said control means selectively supplies fluid to said at least one inlet port and said the other inlet ports.

13. A fluid dispersal device according to claim 1, further comprising:
 a deflection amount increase passage provided between said second chamber and said outlet throat for increasing the amount of deflection of the fluid jet;
 said deflection amount increase passage comprising guide walls on opposite sides of the nozzle center line for making the fluid jet attach to said guide walls and guiding the attached fluid jet to the downstream ends of said guide walls, the distance between said guide walls increasing toward said downstream ends, and downstream turn walls on said downstream ends for making the fluid jet guided by said guide walls flow into said outlet throat at a large angle; the distance between said downstream turn walls decreasing toward said outlet throat.

14. A fluid dispersal device according to claim 13, wherein said guide walls are formed into an inclined flat wall, respectively.

15. A fluid dispersal device according to claim 13, wherein said guide walls are formed into an inclined convex or concave wall, respectively.

16. A fluid dispersal device according to claim 13, wherein each of said guide walls is formed into a rectangular concave wall in the downstream half thereof.

* * * * *